US008444847B1

(12) United States Patent
Evans et al.

(10) Patent No.: US 8,444,847 B1
(45) Date of Patent: May 21, 2013

(54) LOW VOLTAGE ELECTROLYSIS OF WATER

(76) Inventors: Craig Evans, Harrisburg, PA (US);
Brian Evans, Bartlett, IL (US); John Evans, Sr., State College, PA (US);
Randy Evans, Midlothian, VA (US);
John Evans, Jr., State College, PA (US);
Todd E. Starner, Mt. Holly Springs, PA (US)

( * ) Notice: Subject to any disclaimer, the term of this patent is extended or adjusted under 35 U.S.C. 154(b) by 508 days.

(21) Appl. No.: 12/707,157

(22) Filed: Feb. 17, 2010

Related U.S. Application Data

(60) Provisional application No. 61/155,809, filed on Feb. 26, 2009.

(51) Int. Cl.
 *C25C 1/02* (2006.01)
(52) U.S. Cl.
 USPC .......................... 205/628; 205/633; 205/637
(58) Field of Classification Search
 USPC .................................. 204/272; 205/628–639
 See application file for complete search history.

(56) References Cited

U.S. PATENT DOCUMENTS

| | | | | |
|---|---|---|---|---|
| 1,477,629 A | * | 12/1923 | Chrisma | 204/253 |
| 4,053,376 A | * | 10/1977 | Carlin | 205/556 |
| 4,218,520 A | * | 8/1980 | Zaromb | 429/404 |
| 4,415,412 A | | 11/1983 | Vandegrift et al. | |
| 4,670,113 A | * | 6/1987 | Lewis | 205/440 |
| 4,699,700 A | * | 10/1987 | Dhooge | 205/560 |
| 4,795,537 A | * | 1/1989 | Timewell | 205/341 |
| 5,085,753 A | * | 2/1992 | Sherman | 204/267 |
| 5,376,471 A | | 12/1994 | Hunter et al. | |
| 5,401,374 A | * | 3/1995 | Leutwyler | 204/272 |
| 5,505,823 A | | 4/1996 | Rendall | |
| 6,063,258 A | * | 5/2000 | Sayama et al. | 205/637 |
| 7,459,071 B2 | * | 12/2008 | Omasa | 205/628 |
| 2006/0249393 A1 | * | 11/2006 | Ghosh et al. | 205/639 |
| 2008/0318095 A1 | * | 12/2008 | Gil et al. | 429/19 |
| 2010/0224502 A1 | * | 9/2010 | Carey | 205/340 |

FOREIGN PATENT DOCUMENTS

RU 2314253 C1 * 1/2008

OTHER PUBLICATIONS

Azumi, K.; Ueno, T.; Seo, M.: Cathodic dissolution behavior of an aluminum wire electrode in solutions containing borate and sulfate ions. Journal of Electroanalytical Chemistry, 2004, p. 1-7.*
Translation of RU 2314253.*

(Continued)

*Primary Examiner* — Nicholas A Smith
*Assistant Examiner* — Brian W Cohen
(74) *Attorney, Agent, or Firm* — Polster, Lieder, Woodruff & Lucchesi, L.C.

(57) ABSTRACT

A method is provided for conducting electrolysis at or below 1.23 V. The method comprises filling an electrolysis reactor having an aluminum anode and a copper cathode with a sufficient amount of solution such that at least a portion of the anode and the cathode are immersed in the solution; the solution comprising water, an electrolyte and a catalyst; and applying a voltage across the reactor of less than or equal to 1.23 V. The solution is comprised of water, aluminum sulfate and an ammonium salt. The method allows for total gas to be produced at a rate in excess of the theoretical maximum 1.06 l/min at a current of 93 amps.

21 Claims, 2 Drawing Sheets

OTHER PUBLICATIONS

John Petrovic and George Thomas—"Reaction of Aluminum with Water to Produce Hydrogen"—A Study of Issues Related to the Use of Aluminum for On-Board Vehicular Hydrogen Storage, from the U.S. Department of Energy; Version 1.0 2008—26 pages.

R. R. Salem—"Aluminum Hydroxide and Hydrogen Produced by Water Electrolysis", Protection of Metals and Physical Chemistry of Surfaces, vol. 45, No. 6—2009—pp. 752-755.

A. E. Sheindlin and A. Z. Zhuk—"Concept of Aluminum Hydrogen Energy Industry", Russian Journal of General Chemistry, vol. 77, No. 4—2007—pp. 778-782.

* cited by examiner

LOW VOLTAGE ELECTROLYSIS OF WATER

CROSS-REFERENCE TO RELATED APPLICATIONS

This application claims priority to U.S. Provisional App. No. 61/155,809 filed Feb. 26, 2009 and which incorporated herein by reference.

STATEMENT REGARDING FEDERALLY SPONSORED RESEARCH OR DEVELOPMENT

Not Applicable.

TECHNICAL FIELD

This invention relates to electrolysis of water, and, in particular, to a method for carrying out electrolysis below 1.23 volts (V).

BACKGROUND OF THE INVENTION

Hydrogen exists in its atomic state throughout interstellar space, on the order of about one hydrogen atom per cubic meter of space. Hydrogen exists across Earth in the form of chemical compounds like carbohydrates, hydrocarbons, hydrogen halides, metal hydrides, and even comprises about 0.00005% by volume of the Earth's atmosphere. Considering the vast size of the Earth's atmosphere, even this small percentage represents a large amount of hydrogen gas. And finally, the most abundant hydrogen-containing chemical compound found on Earth is water. Water covers about 70% of the surface of the Earth, which indicates that there is plenty of hydrogen available from which to produce hydrogen gas ($H_2$). The challenge is figuring out how to extract the hydrogen from its known sources in an environmentally beneficial and energy economical manner.

Hydrogen containing compounds fall into two groups: 1) hydrogen bearing and 2) hydrogen and energy bearing. Water belongs in the first group. Compounds, such as methane, belong in the second group.

Methane will react with steam over a nickel catalyst at 1200° K and one atmosphere to produce hydrogen as follows:

$$CH_4 (g) + H_2O (v) \rightarrow CO (g) + 3H_2 (g) \quad (1)$$

This is a spontaneous reaction with a $\Delta G = -77.7$ kJ/mole $CH_4$.

When a spontaneous chemical reaction occurs, the decrease in free energy, $-\Delta G$, corresponds to the maximum amount of useful work, $W_{max}$, which can be obtained from the reaction:

$$-\Delta G = W_{max} \quad (2)$$

For a chemical reaction which is not spontaneous, $\Delta G$ is positive and $W_{max}$ is negative. What this means is that work must be done on the system through an external source of energy to cause the reaction to occur. The minimum amount of work that must be done on the system is given by $\Delta G$.

Water will theoretically react with four electrons influenced by an electric potential of 1.23 volts (V) to produce hydrogen as follows:

$$2H_2O (l) \Leftrightarrow O_2 (g) + 4H^+ (aq) + 4e^- \quad (3)$$

$$4H^+ (aq) + 4e^- \Leftrightarrow 2H_2 (g) \quad (4)$$

$$\text{Net: } 2H_2O (l) \Leftrightarrow O_2 (g) + 2H_2 (g) \quad \Delta H = -48.5 \text{ kJ/mole } H_2 \quad (5)$$

This is an exothermic reaction.

However, the theoretical 1.23 V is not achieved in commercial-scale electrolysis. In commercial scale electrolysis, water will react with four electrons influenced by an electric potential of ~1.75 V to produce hydrogen as follows:

$$\text{Net: } 2H_2O (l) \Leftrightarrow O_2 (g) + 2H_2 (g) \quad \Delta H = +51.8 \text{ kJ/mole } H_2 \quad (6)$$

Unlike the theoretical reaction (5), this is an endothermic reaction, and thus requires the input of energy for the reaction to be initiated and run.

The enthalpy of reaction ($\Delta H$) for the theoretical reaction of water with four electrons at 1.23 V, described by equation (5), is a combination of the energy terms for both the forward electrolysis reaction and the reverse recombination reaction, the difference between the energy of formation for hydrogen from water (237.4 kJ/mole $H_2$ @ 1.23 V) and the heat of formation ($\Delta H_f$) of water (285.9 kJ/mole $H_2O$) (i.e., heat of combustion of one mole of $H_2$) or:

$$237.4 \text{ kJ/mole} - 285.9 \text{ kJ/mole} = -48.5 \text{ kJ/mole } H_2 \quad (7)$$

Because electrolysis in the real world does not operate at the theoretical minimum potential of 1.23 V, but instead operates at ~1.75 V, we are forced to work with the endothermic reaction found in equation (6) instead of the exothermic reaction found in equation (5).

The forward electrolysis reaction described by equation (5) moves through a theoretical potential of 1.23 volts and yields the specific energy of formation for hydrogen found in equation (7):

$$(4e^-/2 \text{ molecules } H_2) \times (1.6022 \times 10^{-19} \text{ C}/e^-) \times (1.23 \text{ J/C}) = 3.9414 \times 10^{-19} \text{ J/molecule } H_2 \quad (8)$$

$$(3.9414 \times 10^{-19} \text{ J/molecule } H_2) \times (6.0221 \times 10^{23} \text{ molecules/mole}) = 237.4 \text{ kJ/mole } H_2 \quad (9)$$

The heat of formation ($\Delta H_f$) for one mole of water is:

$$\Delta H_f \text{ of } H_2O \text{ (liquid)} = 285.9 \text{ kJ/mole } H_2O \quad (10)$$

Since there is one mole of $H_2$ for every mole of $H_2O$:

$$\Delta H \text{ combustion of } H_2 \text{ (g)} = 285.9 \text{ kJ/mole } H_2 \quad (11)$$

The enthalpy of reaction for the actual reaction of water with four electrons at 1.75 V, described by equation (6), is a combination of the energy terms for both the forward electrolysis reaction and the reverse recombination reaction:

$$337.7 \text{ kJ/mole (@1.75 V)} - 285.9 \text{ kJ/mole} = +51.8 \text{ kJ/mole } H_2 \quad (12)$$

The forward electrolysis reaction described by equation (6) moves through an actual potential of 1.75 volts and yields the specific energy of formation for hydrogen found in equation (12):

$$(4e^-/2 \text{ molecules } H_2) \times (1.6022 \times 10^{-19} \text{ C}/e^-) \times (1.75 \text{ J/C}) = 5.6077 \times 10^{-19} \text{ J/molecule } H_2 \quad (13)$$

$$(5.6077 \times 10^{-19} \text{ J/molecule } H_2) \times (6.0221 \times 10^{23} \text{ molecules/mole}) = 337.7 \text{ kJ/mole } H_2 \quad (14)$$

Because commercial-scale electrolysis of water takes place at ~1.75 V, instead of the theoretical minimum potential of 1.23 V, the maximum system energy recovery from electrolysis achieved through the reverse recombination reaction found in equation (6) is:

$$(285.9 \text{ kJ/mole})/(337.7 \text{ kJ/mole}) \times 100\% = 84.7\% \quad (15)$$

Hydrogen-powered fuel cells operate at 1.23 V of electrical potential. Therefore, the maximum system energy recovery that could be achieved by running a fuel cell from the hydrogen gas generated by the 1.75 V potential forward electrolysis reaction found in equation (6) is:

$$(237.4 \text{ kJ/mole})/(337.7 \text{ kJ/mole}) \times 100\% = 70.3\%, \quad (16)$$

which is the ratio of 1.23 volts to 1.75 volts times 100%.

From an energy economical standpoint, equation (1) would be the more favorable route for producing hydrogen gas. However, there is a limited supply of methane and the oxidation of the carbon monoxide produces carbon dioxide, which is a greenhouse gas. From an environmentally beneficial standpoint, equation (6) would be the more favorable route for producing hydrogen. However, this route requires an external source of clean energy to maintain its environmental benefit.

The energy recovery of a system that combusts the hydrogen produced from the forward electrolysis reaction in equation (6) is 84.7%, as illustrated by equation (15). The energy recovery of a system that runs a fuel cell from the hydrogen produced from the forward electrolysis reaction in equation (6) is 70.3%, as illustrated by equation (16). These are two pathways that demonstrate that water is in fact a hydrogen carrier as opposed to a material like methane which is both a hydrogen and energy carrier. Therefore, the only way to increase the efficiency of converting electrical energy into hydrogen from water is to find a spontaneous or exothermic chemical reaction that could take place in the electrolysis cell and would couple the excess energy with the impressed voltage to lead to low splitting voltages—i.e., less than 1.23 volts.

BRIEF SUMMARY OF THE INVENTION

Briefly stated, and as set forth in the claims below, an electrolysis reactor and electrolytic solution are provided which allows for electrolysis at and below 1.23 V.

The reactor comprises a reactor vessel, an anode, a cathode, and a power supply in electrical communication with the cathode and anode. The power supply has a positive terminal and a negative terminal, with the positive terminal being in electrical communication with the anode and the negative terminal being in electrical communication with the cathode. The power supply can be a battery, a plurality of batteries connected in series or parallel, or an AC to DC converter power supply which is connected to a wall outlet.

The anode can be made from aluminum or an aluminum alloy and comprises at least one generally vertically extending pipe or rod. In one embodiment, the anode comprises an aluminum pipe. In another embodiment, the anode comprises a central aluminum pipe and at least one aluminum pipe or rod adjacent to the outer surface of the central aluminum pipe. In a further embodiment, the anode can be a central aluminum pipe with at least one aluminum pipe and rod adjacent to the outer surface of the central aluminum pipe.

The cathode can be made from copper or a copper alloy and comprises a coiled tube or solid wires, which surrounds the anode. The coil comprises about 3.67 to about 4.80 turns per vertical foot of the cathode. Thus, for example, if the copper cathode coil is 30"-36" tall, the cathode would comprise 11-12 turns. Additionally, the copper coil comprises about 16.67° to about 20.80° of cathode tube or solid wires per vertical foot of the cathode. Thus, for example, for a cathode that is about 30"-36" tall, the coiled tube or solid wires of the cathode has an overall length of about 50'-52' (for a variable diameter coiled tube that is about 14"-19" in diameter and constant diameter coiled solid wires that are 20" in diameter).

The solution comprises water, an electrolyte, and a catalyst. For the copper cathode and the aluminum anode, the electrolyte can be aluminum sulfate and the catalyst can be an ammonium salt. The ammonium salt can be a halogen based tetrabutylammonium salt, and in a preferred embodiment, the tetrabutylammonium salt is tetrabutylammonium bromide (T-BAB). The solution can be about 0.10 M to about 0.20 M electrolyte and about 0.03 M to about 0.04 M catalyst. The electrolyte and catalyst are present in a ratio of about 3.3:1 to about 5.0:1 by molarity.

The method comprises conducting electrolysis by applying a voltage across the reactor of less than or equal to 1.23 V. The electrolysis can be performed at ambient (i.e., room) temperature and pressure. The current of the system is between about 0.1 amps and about 6.0 amps; and the resistance of the system is between about 0.1 ohms and about 0.2 ohms at these currents. We have found that this electrolysis method can separate water into its constituent elements (i.e., produce $O_2$ and $H_2$ gas) at voltage levels as low as 0.01 V, and once the procedure has started, will continue to produce gas even when the voltage is 0.00 V. Additionally, the total gas (i.e., both $H_2$ and $O_2$) is produced at a rate in excess of 1.06 l/min, which is greater than the theoretical maximum total gas flow rate for a current of 93 amps (A).

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
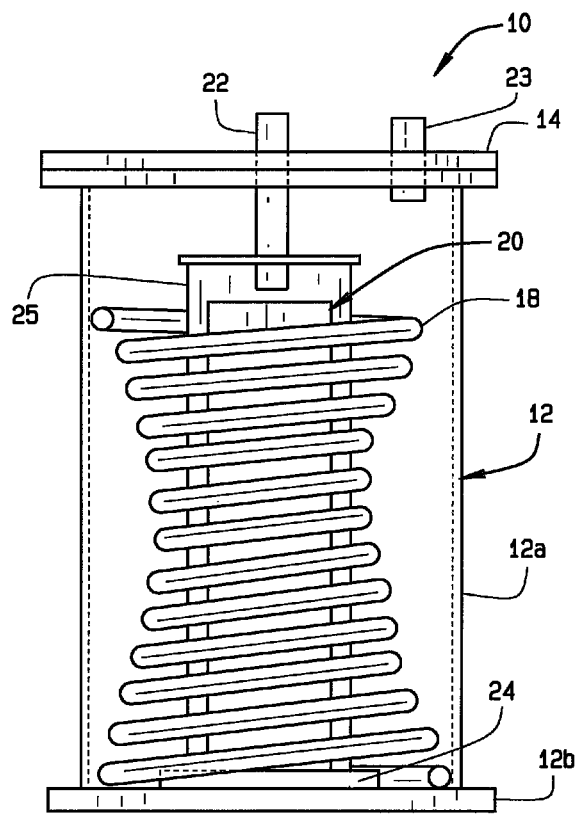
FIG. 1 is a perspective view of an electrolysis reaction tank.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

The electrolysis reactor 10 is shown in FIG. 1. The reactor comprises a 55 gallon cylindrical tank 12 having a side wall 12*a* and a bottom 12*b*. A preferred tank has a tank wall thickness of 0.125", an ID of 20" and a height of 40". A tank lid 14 is fitted over the tank. A channel is formed near the circumference of the lid to receive a ring such that an air-tight seal can be formed between the tank and the lid. Two 1" tubes 22 and 23(are fitted to the top of the tank to direct gases from the tank. The tube 22 defines an $O_2$ exit port for the electrolysis reactor; and the tube 23 defines an $H_2$ exit port 23 for the electrolysis reactor.

A cathode 18 is positioned in the tank. The cathode 18 is formed from a tube, and as seen, is formed into a spiral. As shown in the drawing, the cathode spiral generally has an hour-glass shape. However, the spiral could by cylindrically shaped, or could be convex, rather than concave. Other cathode shapes could be used as well. For example, the cathode could comprise a plurality of tubes which extend vertically into the tank. The cathode 18 that was used for the tests described below was comprised of a coiled 50' copper tube having a wall thickness of 0.032" and an OD of about 0.5", providing for a cross-sectional area of about 0.3 cm². The cathode coil was approximately 3' tall and was comprised of 12 turns. In the embodiment shown, the coil had a diameter of about 19" at its widest and a diameter of about 14" at its narrowest point. The cathode coil is held erect in the tank by PVC rods and copper rods which run from the top to the bottom of the coil. In other embodiments, the coil was cylindrical in shape and had an outer diameter of about 20", so that it would be received snuggly within the tank 12.

An anode 20 is positioned in the tank. As seen in FIG. 1, the anode 20 extends through the center of the spiral defined by the cathode 18. The anode is surrounded by a cylinder 25 to separate the $O_2$ and $H_2$ which are formed during electrolysis. The cylinder that was used was a clear plastic cylinder. The cylinder 25 serves to separate the $O_2$ and $H_2$ gases produced during electrolysis. The $O_2$ exit port tube 22 extends into the area surrounded by the cylinder 25, and the $H_2$ exit port tube 23 extends into the area of the reaction tank outside of the cylinder 25.

Figure 2:
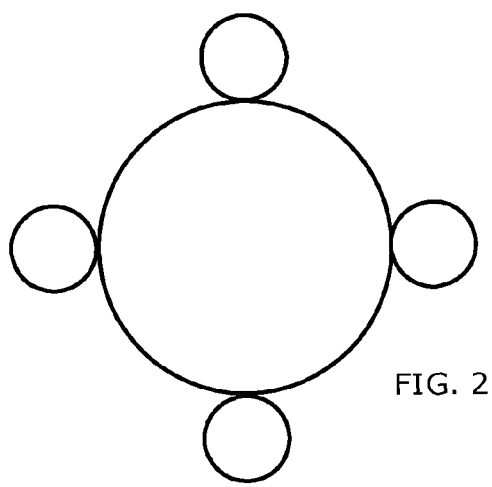
FIGS. 2-4 are schematic drawings of various anode configurations used in the electrolysis processes.
Figure 3:
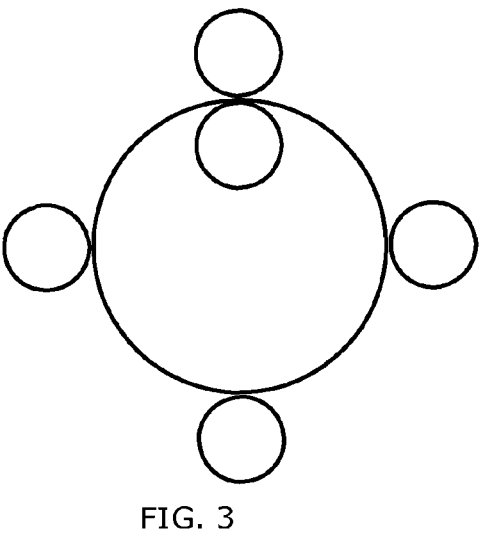
Figure 4:
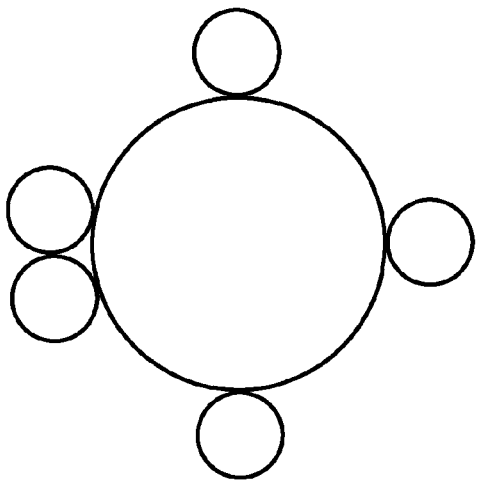

The anode 20 can be a single tube. Alternatively, the anode can have a configuration as shown in FIGS. 2-4, in which the anode comprises a central hollow tube 20a with one or more smaller diameter rods 20b positioned around the central tube. The additional rods 20b are solid and increase the effective surface area of the anode 20. The central anode 20a used in the tests described below is formed from an aluminum pipe that is about 3 ft (about 0.9 m) long and has an outer diameter of about 8.5" (about 21.7 cm) and a wall thickness of about 0.3" (about 0.7 cm). The aluminum used for the central anode 20a was 6061 T6 aluminum alloy. The aluminum anode has a handle (not shown) at its top. The handle can be made from an aluminum rod to assist in the lifting of the anode in and out of the tank. The rod can, for example, be about 0.5" (about 1.3 cm) in diameter. The aluminum anode 20 sits on a heavy plastic base 24 that lifts the anode 20 about 0.4" (about 1.0 cm) from the bottom of the tank which allows for easy positioning of the anode in the tank.

A power supply is connected between anode and cathode to provide a portion of the energy for the electrolysis. As set forth below, the power supply can be batteries or a DC power supply. Other forms of power supplies could be used as well. The DC power supply used in several of the tests was a 1000 watt DC power supply that allows for 0.01 volt increments when selecting the voltage set point. This feature gives high resolution capability to the experimental process. The 1000 watt DC power supply produces a maximum of 130 amps across a voltage range of 0.00 volts to 7.66 volts. The power supply was a Xantrex XHR 7.5-130 1000 watt DC unit.

The solution received in the tank 10 is comprised of three distinct chemical compounds: water, aluminum sulfate, and tetrabutylammonium bromide (a catalyst/surfactant). Sufficient aluminum sulfate (alum) and tetrabutylamonium bromide (T-BAB) are added to the water such that they have molarities of about 0.1 M to about 0.2 M and 0.03 M to about 0.04 M, respectively. These three chemical compounds react inside the electrolysis reactor 10 in a manner which is not quite understood, but which results in the production of an insoluble, white crystalline precipitate material believed to be aluminum hydroxide ($Al(OH)_3$), and oxygen and hydrogen gas at voltages at or below 1.23 volts. Exactly how these two separate, yet coupled, reactions (i.e., production of $Al(OH)_3$ and production of $H_2$) occur is not fully understood but it is believed that the reaction that forms the aluminum hydroxide releases energy which couples with the applied voltage and allows for splitting of water at low voltages. In other words, the primary or driving reaction is the reaction occurring on the solid aluminum anode which produces aluminum hydroxide. Excess energy from this reaction adds or couples to the energy being supplied by the external power supply to provide sufficient energy to electrolyze water and break water into hydrogen gas and oxygen gas at low voltages. This is best explained as follows.

Based on experimental data, the electrolysis reactor system has demonstrated its ability to split water into hydrogen and oxygen gas at 1.00 volt and produces 2.6 amps of electrical current:

$$(2 \text{ molecules } H_2/4e^-) \times (e^-/1.6022 \times 10^{-19} \text{ C}) \times (\text{mole}/6.0221 \times 10^{23} \text{ molecules}) \times (2.6 \text{ C/sec}) = 0.000013473 \text{ moles } H_2/\text{sec} \quad (17)$$

By running the hydrogen gas generated at 1.00 volt and 2.6 amps, as shown in equation (17), through a fuel cell operating at 1.23 volts, as shown in equations (8) and (9), we can then calculate the output power from the electrolysis system which can then be compared to its input power:

$$(4e^-/2 \text{ molecules } H_2) \times (1.6022 \times 10^{-19} \text{ C}/e^-) \times (1.23 \text{ J/C}) = 3.9414 \times 10^{-19} \text{ J/molecule } H_2 \quad (8)$$

$$(3.9414 \times 10^{-19} \text{ J/molecule } H_2) \times (6.0221 \times 10^{23} \text{ molecules/mole}) = 237.4 \text{ kJ/mole } H_2 \quad (9)$$

$$(1.3473 \times 10^{-5} \text{ moles } H_2/\text{sec}) \times (237.4 \text{ kJ/mole } H_2) = 3.1984902 \text{ J/sec} = 3.1984902 \text{ watts (output power)} \quad (18)$$

The input power is calculated as follows:

$$(1.00 \text{ volt}) \times (2.6 \text{ amps}) = 2.6 \text{ watts (input power)} \quad (19)$$

$$\text{Input} - \text{Output} = \text{Accumulation} \quad (20)$$

Substituting equations (18) and (19), for 1.00 volt, into equation (20) results in the following:

$$2.6 \text{ watts} - 3.2 \text{ watts} = -0.6 \text{ watts} \quad (21)$$

Equation (21) shows that the primary reaction that forms the material believed to be aluminum hydroxide is in fact an exothermic reaction running at 0.6 watts of power, while the electrolysis reactor is running at an applied voltage of 1.00 volt. The primary chemical reaction runs without any energy input and produces an appreciable quantity of the insoluble, white crystalline material believed to be aluminum hydroxide. This reinforces the conclusion that this primary reaction is an exothermic reaction.

Based on experimental data, the electrolysis reactor system has demonstrated its ability to split water into hydrogen and oxygen gas at 0.50 volts and produces 0.8 amps of electrical current:

$$(2 \text{ molecules } H_2/4e^-) \times (e^-/1.6022 \times 10^{-19} \text{ C}) \times (\text{mole}/6.0221 \times 10^{23} \text{ molecules}) \times (0.8 \text{ C/sec}) = 4.146 \times 10^{-6} \text{ moles } H_2/\text{sec} \quad (22)$$

By running the hydrogen gas generated at 0.50 volts and 0.8 amps, as shown in equation (22), through a fuel cell operating at 1.23 volts, as shown in equations (8) and (9), the output power from the electrolysis system can then be calculated and compared to its input power:

$$(4e^-/2 \text{ molecules } H_2) \times (1.6022 \times 10^{-19} \text{ C}/e^-) \times (1.23 \text{ J/C}) = 3.9414 \times 10^{-19} \text{ J/molecule } H_2 \quad (8)$$

$$(3.9414 \times 10^{-19} \text{ J/molecule } H_2) \times (6.0221 \times 10^{23} \text{ molecules/mole}) = 237.4 \text{ kJ/mole } H_2 \quad (9)$$

$$(0.000004146 \text{ moles } H_2/\text{sec}) \times (237.4 \text{ kJ/mole } H_2) = 0.984260400 \text{ J/sec} = 0.984260400 \text{ watts (output power)} \quad (23)$$

The input power is calculated as follows:

$$(0.50 \text{ volt}) \times (0.8 \text{ amps}) = 0.4 \text{ watts (input power)} \quad (24)$$

Substituting equations (23) and (24), for 0.50 volts, into equation (20) results in the following:

$$0.4 \text{ watts} - 1.0 \text{ watts} = -0.6 \text{ watts} \quad (25)$$

Equation (25) further supports the idea that the reason the electrolysis reactor is able to achieve low voltage splitting of water into hydrogen and oxygen gas is because of the exothermic reaction that produces the material believed to be aluminum hydroxide.

The chemistry of this exothermic chemical reaction, as noted above, is not fully understood. However, the mechanisms believed to be occurring that result in the overall reaction which allows the electrolysis reactor to achieve its high level of performance under impressed (or applied) voltage are as follows.

$$Al_2(SO_4)_3 + 6H_2O + 2Al \rightarrow 2Al(OH)_3 + Al_2(SO_4)_3 + 3H_2 \quad (26)$$

$$Al_2(SO_4)_3 + 6H_2O \rightarrow Al(OH)_3 + 3H_2SO_4 \quad (27)$$

Equations (26) and (27) are spontaneous reactions and together result in the following overall reaction:

$$Al_2(SO_4)_3 + 12H_2O + 2Al \rightarrow 4Al(OH)_3 + 3H_2SO_4 + 3H_2 \quad (28)$$

It is believed that the sulfuric acid formed in equation (28) is neutralized in the following way:

$$4Al(OH)_3 + 3H_2SO_4 + 3H_2 \Leftrightarrow 2Al(OH)_3 + Al_2(SO_4)_3 + 3H_2 + 6H_2O \quad (29)$$

All of these reactions are occurring at the following concentration ranges:

0.10 M-0.20 M aluminum sulfate (alum)

0.03 M-0.04 M tetrabutylammonium bromide (surfactant/catalyst)

EXAMPLES

Example 1

26.83 cups of $Al_2(SO_4)_3$ and 1500 g surfactant (tetrabutylammonium bromide) were added to 46 gallons of water ($H_2O$) in the tank. The solution thus had an alum concentration of about 0.10 M.

The reactor initially operated at a reverse electromotive force (emf) of 0.70 V. The reverse emf then dropped to 0.60 V after using an older set of 5-1.5 V D-cell batteries connected in a parallel configuration. A new set of 5-1.5 V D-cell batteries connected in a parallel configuration were attached to the electrolysis tank. With the new batteries, the voltage in the system initially measured 1.30 V, then dropped to 1.25 V at 2.1 amps, yielding a resistance of 0.60 ohms. The system settled in at 1.20 V at 2.1 amps and 0.57 ohms. Gas production was robust even when the system voltage dropped to 1.05 V.

Example 2

The solution used was the same as for Example 1. The system was operated using 5-1.5 V D-cell batteries connected in a parallel configuration resulting in 1.15 V and a current of 1.0 amp. Gas production was very good. A rheostat was attached to the batteries, and the voltage was lowered to 0.50 V at 0.2-0.3 amps, yielding a system resistance of 2.00 ohms. Hydrogen and oxygen were electrolytically produced at the voltage of 0.50 V. The voltage was lowered to 0.20 V temporarily, but the system equilibrated at 0.50 V. Gas production at 0.50 V was light but consistent at steady state. The reactor was able to split water into hydrogen and oxygen at 0.50 V. When the rheostat was removed, voltage returned to 1.15 V at 1.5 amps, yielding a system resistance of 0.77 ohms. After removing the applied voltage, tapping on the outside of the tank released the residual hydrogen from the cathode which resulted in the reverse emf returning to 0.60 V. After 10-15 minutes, the reverse emf returned to 0.50 V which was the initial reading at the beginning of the experiment.

Example 3

In this example, the solution was the same as in Example 1. The system was operated using 5-1.5 V D-cell batteries connected in a parallel configuration resulting in 1.15 V and a current of 1.5 amps. Gas production was very good. Initially, the reverse emf was 0.50 V. By tapping the side of the tank, hydrogen gas was released from the cathode and the reverse emf increased to about 0.60 V.

The same experiment was run using different power sources. In a first test, two 1.5 V D-cell batteries were placed in series and the voltage across the tank increased to 1.60 V at 1.8 amps. In a second test, three 6 V battery chargers were placed in parallel, and voltage across the tank decreased to 1.20 V at 1.9 amps. Then one 12 V battery charger was connected across the tank and the voltage increased to 6.50 V at 34.9 amps (switch was on 10 amps). In a last test, the 12 V battery charger was again connected across the tank, and the voltage measured 7.50 V at 42.1 amps (with the switch set to 50 amps). In all four tests, gas production was excellent.

Example 4

In this example, the solution was the same as in Example 1. The system was operated using 5-1.5 V D-cell batteries connected in a parallel configuration resulting in 1.15 V and a current of 1.5 amps. Gas production was very good. Initially, the reverse emf was 0.25 V. The reverse emf was low due to the large quantities of hydrogen gas on the cathode from the high amperage runs of Example 3.

In a second test, two 1.5 V D-cell batteries were placed in series across the tank. The voltage in the tank increased to 1.60 V at 1.8 amps. Gas production was very good. In a third test, five 1.5 V D-cell batteries were then placed in series across the tank. The voltage measured 1.30 V at 2.8 amps. Gas production remained very good. In a fourth test, three 6 V battery chargers were placed in parallel, and voltage across the tank decreased to 1.10 V at 1.7 amps. Production of gas was very good. In a final test, one 12 V battery charger was placed across the electrodes. The voltage across the tank was 6.40 V at 34.7 amps (switch at 10 amps), and 7.50 V at 42.5 amps (with the switch at 50 amps). Production of gas was excellent.

AC current was 7.0 amps at circuit voltage (~115V) for an % c of about 40%. On several occasions, the volt-ohm-amp meter (VOAM) measured 0.50 V when the emf was removed.

A clear plastic tube 25 was placed over the anode during a later test using the 5-1.5 V D-cell batteries connected in series as the power supply. The 5-1.5 V D-cell batteries in series gave rise to 5.20 V at 0.7 amps. When the plastic tube was removed, the voltage dropped to 1.20 V at 2.2 amps. The plastic tube thus acted as a resistor in the circuit. To reduce the electrical resistance, the plastic tube was subsequently replaced with a cloth covered "skeleton" plastic structure.

Example 5

To 50 gallons of water, sufficient amounts of aluminum sulfate and tetrabutylammonium bromide (T-BAB) were added such that the solution was 0.12 M $Al_2(SO_4)_3$ and 0.03 M T-BAB. This amounted to about 7761 g $Al_2(SO_4)_3$ and about 1828 g T-BAB. The solution was placed in the electrolysis reactor tank. The anode was as described above (i.e., the single 36" tall×8 9/16" OD tube). The cathode was also as described above. The anode and cathode coil were both 36" tall. The power supply was a Xantrex XHR 7.5-130 1000 watt DC power supply. This power supply allowed for accurate control of the voltage within increments of 0.01 V.

The following voltages and amps were achieved across the tank as set forth below in Table I.

TABLE I

| Volts | Amps | | | Ave. Amps |
|---|---|---|---|---|
| 1.23 | 4.4 | 4.5 | 4.5 | 4.5 |
| 1.00 | 2.8 | 3.0 | 2.9 | 2.9 |
| 0.75 | 1.4 | 1.8 | 1.4 | 1.5 |
| 0.50 | 0.9 | 1.0 | 1.0 | 1.0 |
| 0.23 | 0.6 | 0.6 | 0.6 | 0.6 |
| 0.10 | 0.3 | 0.3 | 0.4 | 0.3 |

Hydrogen and oxygen gases were produced at each voltage level. Thus, electrolysis was achieved at voltages as low as 0.10 V.

Example 6

To 50 gallons of water, sufficient amounts of aluminum sulfate and tetrabutylammonium bromide (T-BAB) were added such that the solution was 0.12 M $Al_2(SO_4)_3$ and 0.03 M T-BAB, which is the same solution that was prepared in Example 5. The anode was described as above. The cathode was formed from solid ½" OD, 19 strand, 4/0 HC, 52' copper coil (with 11 turns). The anode was 36" tall and the cathode coil was 30" tall. The power supply was a Xantrex XHR 7.5-130 1000 watt DC power supply.

The following voltages and amps were achieved across the tank as set forth below in Table II.

TABLE II

| Volts | Amps Anode I | | Ave. Amps Anode I | Amps Anode II | % Increase in Amperage |
|---|---|---|---|---|---|
| 1.23 | 3.6 | 3.4 | 3.5 | 5.0 | 43% |
| 1.00 | 2.2 | 2.1 | 2.2 | 3.2 | 48% |
| 0.75 | 1.3 | 1.4 | 1.3 | 1.7 | 28% |
| 0.50 | 0.8 | 1.0 | 0.9 | 1.0 | 11% |
| 0.23 | 0.4 | 0.5 | 0.4 | 0.4 | −8% |
| 0.10 | 0.3 | 0.3 | 0.3 | 0.3 | 0% |

The amperage readings under the column "Anode I" use an anode as described above (i.e., a 3' long pipe having an 8 9/16" OD and a wall thickness of 9/32" made from 6061 T6 aluminum alloy). The anode for the first runs had an external surface area of 968.4 in². The amperage readings under the column "Anode II" are the result of a second set of runs after inserting four 3" OD, 6061 T6 511 aluminum rods that are 36" tall at 0°, 90°, 180°, and 270° around the perimeter of the anode and in contact with it, as seen in FIG. 2. Four gallons of solution had to be removed from the tank due to the volume change resulting from the placement of the four 3" OD aluminum rods into the tank (i.e., Archimedes' Principle). The external surface area of the anode along with the four external rods was approximately 2325.6 in². Thus, these rods effectively increased the surface area of the anode by approximately 140% (or about 35% per external rod). As can be seen, for voltages of 0.50 V and above, the increase in surface area of the anode significantly increased the amperage of the system.

Hydrogen and oxygen gases were produced at each voltage level. Thus, electrolysis was achieved at voltages as low as 0.10 V.

Example 7

The electrolysis reactor tank contained the 46 gallons of solution, as described in Example 6, at 0.12 M $Al_2(SO_4)_3$ and 0.03 M T-BAB. This amounted to about 7140 g $Al_2(SO_4)_3$ and about 1682 g T-BAB. The anode was comprised of the 3' tall, 8 9/16" OD, 6061 T6 alloy aluminum pipe with four 36" tall, 3" OD, 6061 T6 511 alloy aluminum rods placed at 0°, 90°, 180°, and 270° around the perimeter of the 8 9/16'" OD aluminum pipe, and a fifth 36" tall, 3" OD, 6061 T6 511 alloy aluminum rod in contact with the interior wall of the aluminum pipe (as shown in FIG. 3). The cathode was formed from solid ½" OD, 19 strand, 4/0 HC, 52' copper coil (with 11 turns). The anode was 36" tall and the cathode coil was 30" tall. The power supply was a Xantrex XHR 7.5-130 1000 watt DC power supply.

The following voltage and amps were achieved across the tank as set forth below in Table III.

TABLE III

| Volts | Amps Anode I | Amps Anode II | % increase |
|---|---|---|---|
| 1.23 | 4.6 | 5.0 | 8.7% |

In the table above, the column "Anode I" used an anode as just described above (i.e., as shown in FIG. 3). The column "Anode II" denotes a second run in which the fifth 3" OD aluminum rod was removed from the interior of the aluminum pipe and was positioned next to the exterior rod positioned at 270° (as seen in FIG. 4). This effectively increased the external surface area of the anode. In this example, the external surface area of the anode from "Anode I" to "Anode II" was increased from about 2325.6 in² by 339.3 in² to about 2664.9 in² for an increase in external anode surface area of about 14.6%. The increased surface area increased the amperage by 0.4 amps, or about 8.7%. Comparing these results with the results from Example 6 supports the conclusion that each 3" OD, 3' long aluminum rod increased the current by about 0.4 amps. Inasmuch as the production of hydrogen and oxygen via electrolysis is dependent upon current, the increase in current also leads to an increase in hydrogen and oxygen production.

Example 8

The electrolysis reactor tank contained the 46 gallons of solution, as described in Example 7, at 0.12 M $Al_2(SO_4)_3$ and 0.03 M T-BAB. The anode was comprised of the 3' tall, 8.5625" OD, 6061 T6 alloy aluminum pipe with five 36" tall, 3" OD, 6061 T6 511 alloy aluminum rods placed at 0°, 90°, 180°, ~270° and ~270° around the perimeter of the 8.5625" OD aluminum pipe, and in contact with it. That is, the anode was generally as shown in FIG. 4. The cathode was formed from solid ½" OD, 19 strand, 4/0 HC, 52' copper coil (with 11 turns). The anode was 36" tall and the cathode coil was 30" tall. The power supply was a Xantrex XHR 7.5-130 1000 watt DC power supply.

The following voltage and amps were achieved across the tank as set forth below in Table IV.

TABLE IV

| Volts | Amps Anode I | Amps Anode II |
|---|---|---|
| 1.23 | 5.0 | 3.1 |

In the column "Anode I", the anode was as just described above. In the column "Anode II", a second run was conducted in which the five aluminum rods were removed from the tank and the four gallons of solution were added back into the tank, resulting in 50 gallons of solution in the tank. Removal of the rods from the exterior of the anode reduced the surface area of the anode from about 2664.9 in$^2$ to about 968.4 in$^2$. Accordingly, the amperage was reduced as well. As seen in Table IV, the amperage was reduced by about 1.9 amps for a current reduction of 0.38 (or about 0.4) amps per rod.

The results of Examples 6, 7, and 8 in which the surface area of the anode was altered, shows that the electrical current and attendant hydrogen and oxygen gas production at and below 1.23 V (actual value) can be increased by increasing the surface area of the anode.

Example 9

To 50 gallons of water, sufficient amounts of aluminum sulfate and tetrabutylammonium bromide (T-BAB) were added such that the solution was 0.14 M Al$_2$(SO$_4$)$_3$ and 0.04 M T-BAB. The solution was placed in the electrolysis reactor tank. The anode was comprised of the 3' tall, 8 9/16" OD, 6061 T6 alloy aluminum pipe. The cathode was formed from solid ½" OD, 19 strand, 4/0 HC, 52' copper coil (with 11 turns). The anode was 36" tall and the cathode coil was 36" tall. The power supply was a Xantrex XHR 7.5-130 1000 watt DC power supply.

The following voltages and amps were achieved across the tank as set forth below in Table V.

TABLE V

| Volts | Amps | | | Ave. Amps |
|---|---|---|---|---|
| 1.23 | 3.8 | 4.0 | 4.1 | 4.0 |
| 1.00 | 2.6 | 2.9 | 3.0 | 2.8 |
| 0.75 | 1.5 | 1.8 | 1.7 | 1.7 |
| 0.50 | 0.9 | 0.8 | 0.9 | 0.9 |
| 0.23 | 0.5 | 0.4 | 0.5 | 0.5 |
| 0.10 | 0.3 | 0.3 | 0.3 | 0.3 |
| 0.08 | 0.3 | 0.3 | 0.3 | 0.3 |
| 0.06 | 0.3 | 0.2 | 0.3 | 0.3 |
| 0.04 | 0.2 | 0.2 | 0.2 | 0.2 |
| 0.02 | 0.2 | 0.2 | 0.2 | 0.2 |
| 0.01 | 0.2 | 0.2 | 0.2 | 0.2 |

Hydrogen was produced at all voltage levels.

Example 10

The electrolysis reactor tank contained the 50 gallons of solution, as described in Example 9, at 0.14 M Al$_2$(SO$_4$)$_3$ and 0.04 M T-BAB. The anode was comprised of the 3' tall, 8.5625" OD, 6061 T6 alloy aluminum pipe with four 2 7/8" OD, 6061 T6 alloy aluminum pipes that are 36" tall placed at 0°, 90°, 180°, and 270° around the external perimeter of the 8.5625" OD pipe and in contact with the pipe. The cathode was formed from solid ½" OD, 19 strand, 4/0 HC, 52' copper coil (with 11 turns). The anode was 36" tall and the cathode coil was 36" tall. The power supply was a Xantrex XHR 7.5-130 1000 watt DC power supply.

The following voltages and amps were achieved across the tank as set forth below in Table VI.

TABLE VI

| Volts | Amps | | | Ave. Amps |
|---|---|---|---|---|
| 1.23 | 4.9 | 4.9 | 4.9 | 4.9 |
| 1.00 | 3.7 | 3.0 | 3.5 | 3.4 |
| 0.75 | 1.9 | 2.3 | 2.0 | 2.1 |
| 0.50 | 0.9 | 1.4 | 0.9 | 1.1 |
| 0.23 | 0.5 | 0.7 | 0.5 | 0.6 |
| 0.10 | 0.3 | 0.4 | 0.3 | 0.3 |
| 0.08 | 0.3 | 0.4 | 0.3 | 0.3 |
| 0.06 | 0.3 | 0.3 | 0.3 | 0.3 |
| 0.04 | 0.2 | 0.3 | 0.2 | 0.2 |
| 0.02 | 0.2 | 0.2 | 0.2 | 0.2 |
| 0.01 | 0.2 | 0.2 | 0.2 | 0.2 |

Hydrogen was produced at all voltage levels.

Example 11

The electrolysis reactor tank contained the 50 gallons of solution, as described in Example 10, at 0.14 M Al$_2$(SO$_4$)$_3$ and 0.04 M T-BAB. The anode was comprised of the 3' tall, 8.5625" OD, 6061 T6 alloy aluminum pipe with four 2 7/8" OD, 6061 T6 alloy aluminum pipes that are 36" tall placed at 0°, 90°, 180°, and 270° around the external perimeter of the 8.5625" OD pipe and in contact with the pipe. The cathode was formed from solid ½" OD, 19 strand, 4/0 HC, 52' copper coil (with 11 turns). The anode was 36" tall and the cathode coil was 36" tall. The power supply was a Xantrex XHR 7.5-130 1000 watt DC power supply.

The following voltages and amps were achieved across the tank as set forth below in Table VII.

TABLE VII

| Volts | Amps | | | Ave. Amps |
|---|---|---|---|---|
| 1.23 | 5.3 | 5.2 | 5.3 | 5.3 |
| 1.00 | 3.7 | 3.3 | 3.6 | 3.5 |
| 0.75 | 2.3 | 2.5 | 2.3 | 2.4 |
| 0.50 | 1.4 | 1.5 | 1.4 | 1.4 |
| 0.23 | 0.6 | 0.7 | 0.6 | 0.6 |
| 0.10 | 0.4 | 0.5 | 0.4 | 0.4 |
| 0.08 | 0.4 | 0.5 | 0.4 | 0.4 |
| 0.06 | 0.4 | 0.4 | 0.4 | 0.4 |
| 0.04 | 0.3 | 0.4 | 0.3 | 0.3 |
| 0.02 | 0.3 | 0.3 | 0.3 | 0.3 |
| 0.01 | 0.3 | 0.3 | 0.3 | 0.3 |

Hydrogen was produced at all voltage levels.

In Examples 10 and 11, the anode, cathode, and solution for Examples 10 and 11 were the same, such that Examples 10 and 11 were operated under substantially the same conditions. However, it will be noted that the amps produced in Example 11 were slightly higher at each voltage level than in Example 10. The experiments for the Example 11 results were run the day after the Example 10 experiments were run. After the Example 9 experiments were run, the new anode was placed in the tank, and the tank was allowed to run at 1.00 V for about four hours before being turned off for the night. Before being turned off, the amp meter was reading 4.0 amps (which is noted to be higher than the amps obtained during the day experiments). The increase in amperage was due to the extra reaction surface area provided by the new anode. Before turning the system off, the voltage was increased to 1.23 V, and the current settled in at 5.9 amps. The next day (the day the Example 10 experiments were run), when the system was turned on, the current climbed to 4.9 amps (at 1.23 volts), rather than the 5.9 amps that was recorded the previous evening. Even though the conditions for the Example 10 and Example 11 experiments were substantially the same, the performance improved for an unknown reason. This might be attributable to the system having been run for a period of time prior to beginning the Example 11 experiments. It is notable that the day after the Example 11 experiments were run, the system was able to produce hydrogen at a system current of 0.3 amps, even though the voltage was set at 0.00 volts.

Example 12

The electrolysis reactor tank was filled with 50 gallons of water. Sufficient $Al_2(SO_4)_3$ and T-BAB were added to the water so that the solution was 0.20 M $Al_2(SO_4)_3$ and 0.04 M T-BAB. The anode was comprised of the 3' tall, 8.5625" OD, 6061 T6 alloy aluminum pipe with four 2⅞" OD, 6061 T6 alloy aluminum pipes that were 36" tall and placed at 0°, 90°, 180°, and 270° around the external perimeter of the 8.5625" OD pipe and in contact with the pipe. That is, the anode was as shown in FIG. 2. The cathode was formed from solid ½" OD, 19 strand, 4/0 HC, 52' copper coil (with 11 turns). The turns of the coil were sized (in diameter) and spaced apart vertically, such that the cathode would be received in the tank, surrounding the anode, and have a height of 36". The power supply was a Xantrex XHR 7.5-130 1000 watt DC power supply.

The following voltages and amps were achieved across the tank as set forth below in Table VIII.

TABLE VIII

| Volts | Amps | | | Ave. Amps |
|---|---|---|---|---|
| 1.23 | 5.7 | 5.4 | 5.3 | 5.5 |
| 1.00 | 3.2 | 3.2 | 3.2 | 3.2 |
| 0.75 | 1.8 | 1.8 | 1.8 | 1.8 |
| 0.50 | 0.9 | 1.0 | 0.9 | 0.9 |
| 0.23 | 0.4 | 0.6 | 0.4 | 0.5 |
| 0.10 | 0.3 | 0.3 | 0.3 | 0.3 |
| 0.08 | 0.3 | 0.3 | 0.3 | 0.3 |
| 0.06 | 0.2 | 0.2 | 0.3 | 0.2 |
| 0.04 | 0.2 | 0.2 | 0.2 | 0.2 |
| 0.02 | 0.2 | 0.2 | 0.2 | 0.2 |
| 0.01 | 0.1 | 0.1 | 0.2 | 0.1 |
| 0.00 | 0.1 | 0.1 | 0.1 | 0.1 |

Hydrogen was produced at all voltage levels. This example demonstrates that even when no voltage is being supplied to the reactor from the power supply, the electrolysis of water will continue. From this data, it is believed that the chemical reactions as set forth above in equations (26) and (27) provide sufficient energy to the system to allow the system to continue the electrolysis of water in the absence of voltage from the external power source after the power source has been shut down.

Example 13

The electrolysis reactor tank was filled with 50 gallons of water. Sufficient $Al_2(SO_4)_3$ and T-BAB were added to the water so that the solution was 0.20 M $Al_2(SO_4)_3$ and 0.04 M T-BAB. The anode was comprised of (1) the 3' tall, 8.5625" OD, 6061 T6 alloy aluminum pipe, (2) four 2⅞" OD, 6061 T6 alloy aluminum pipes that were 36" tall and placed at 0°, 90°, 180°, and 270° around the external perimeter of the 8.5625" OD pipe, and (3) four 3" OD, 6061 T6 511 alloy aluminum rods that were 36" tall and placed at 45°, 135°, 225°, and 315°. The four 2⅞" tubes and four 3" rods were all 36" tall and were placed in the noted positions around the external perimeter of the 8.5625" OD pipe and in contact with the pipe. With the four extra rods, the external surface area of the anode was about 3626.2 $in^2$. The cathode was formed from solid ½" OD, 19 strand, 4/0 HO, 52' copper coil (with 11 turns). The turns of the coil were sized (in diameter) and spaced apart vertically, such that the cathode would be received in the tank, surrounding the anode, and have a height of 36". The power supply was a Xantrex XHR 7.5-130 1000 watt DC power supply.

The following voltages and amps were achieved across the tank as set forth below in Table IX.

TABLE IX

| Volts | Amps | | | Ave. Amps |
|---|---|---|---|---|
| 1.23 | 6.0 | 5.8 | 5.8 | 5.9 |
| 1.00 | 3.7 | 3.7 | 3.7 | 3.7 |
| 0.75 | 2.1 | 2.1 | 1.9 | 2.0 |
| 0.50 | 1.3 | 1.5 | 1.2 | 1.3 |
| 0.23 | 0.8 | 0.9 | 0.7 | 0.8 |
| 0.10 | 0.5 | 0.5 | 0.4 | 0.5 |
| 0.08 | 0.4 | 0.4 | 0.4 | 0.4 |
| 0.06 | 0.4 | 0.3 | 0.3 | 0.3 |
| 0.04 | 0.3 | 0.3 | 0.3 | 0.3 |
| 0.02 | 0.3 | 0.3 | 0.3 | 0.3 |
| 0.01 | 0.3 | 0.3 | 0.2 | 0.3 |
| 0.00 | 0.2 | 0.2 | 0.2 | 0.2 |

Hydrogen was produced at all voltage levels. This example again demonstrated that even when no voltage is being supplied to the reactor from the power supply, the electrolysis of water will continue.

Other Observations

In various tests, a maximum current of 93 amps was achieved. At this current level, the theoretical maximum production of total gas production (i.e., production of both $H_2$ and $O_2$) would be 1.06 l/min. However, a total gas flow rate of greater than 1.1 l/min was being produced. Thus, not only did the reactions of equations (26) and (27) enable electrolysis of water (and hence production of hydrogen and oxygen gases) at low voltage levels, they increased the production of gas such that the gas production exceeded the maximum theoretical production rate that could be achieved using electricity alone to power the electrolysis of water. The above experiments were conducted over a period of many months. During the entire time, the anodes remained immersed in solution. The aluminum anode spent some 28 months in solution. At the start of this 28 month time period, the 8 9/16" aluminum anode had a wall thickness of 4.5/16" (i.e., 9/32" or ~7.1 mm); and at the end of this period, the wall thickness was still 4.5/16". There was pitting on the surface of the aluminum anode but for all intents and purposes the anode is intact. Based on this, it is thought that equation 26 cannot be the only exothermic reaction at play. If it were, more degradation in the aluminum anode should have been observed.

As various changes could be made in the above constructions without departing from the scope of the invention, it is intended that all matter contained in the above description or shown in the accompanying drawings shall be interpreted as illustrative and not in a limiting sense.

The invention claimed is:

1. A method of conducting electrolysis at low voltages comprising:
    filling an electrolysis reactor having an aluminum or aluminum alloy anode and a copper or copper alloy cathode with a sufficient amount of solution such that at least a portion of the anode and the cathode are immersed in the solution; the solution comprising water, an electrolyte comprised of aluminum sulfate, and an ammonium salt catalyst; and
    applying a voltage V across the reactor, wherein $0<V\leq0.4$; and
    producing hydrogen gas and oxygen gas via electrolysis.

2. The method of claim 1 wherein the ammonium salt is a tetrabutylammonium salt.

3. The method of claim 2 wherein the tetrabutylammonium salt is tetrabutylammonium bromide (T-BAB).

4. The method of claim 1 wherein the solution is about 0.10 M to about 0.20 M aluminum sulfate.

5. The method of claim 1 wherein the solution is about 0.03 M to about 0.04 M catalyst.

6. The method of claim 1 wherein the electrolyte and catalyst are present in a ratio of about 3.3:1 to about 5.0:1 by molarity.

7. The method of claim 1 wherein the solution is at ambient temperature and pressure.

8. The method of claim 1 wherein total hydrogen gas is produced at a rate in excess of 1.06 l/min at a current of 93 amps.

9. The method of claim 1 wherein the anode comprises at least one generally cylindrical cylinder extending generally vertically into the solution and wherein the cathode comprises a coiled tube or wires which encircle the anode.

10. The method of claim 9 wherein the anode comprises a central cylinder and at least one cylinder adjacent to the outer surface of the central cylinder.

11. The method of claim 9 wherein the anode comprises a hollow tube; said anode further comprising a cylinder received within the hollow tube and in contact with an inner surface of the hollow tube.

12. The method of claim 9 wherein the coil comprises about 3.6 to about 4.8 turns per vertical foot of the cathode.

13. The method of claim 12 wherein the coil comprises about 16.6° to about 20.8° of cathode tube or wires per vertical foot of the cathode.

14. The method of claim 1 wherein the step of applying a voltage across the reactor comprises applying a voltage V across the reactor, wherein $0<V\leq0.1$.

15. The method of claim 1 wherein the step of applying a voltage across the reactor comprises applying a voltage of about 0.01 V.

16. A method of conducting electrolysis at low voltages comprising:
    providing an electrolysis reactor having a copper or copper alloy cathode and an aluminum or aluminum alloy anode;
    filling the electrolysis reactor with a sufficient amount of solution comprised of water, an ammonium salt catalyst, and aluminum sulfate such that at least a portion of the anode and at least a portion of the cathode are immersed in the solution;
    running exothermic reactions between water and the anode and between aluminum sulfate and water to produce a precipitate; and
    applying a voltage V across the reactor, wherein $0<V\leq0.4$; and
    producing hydrogen gas and oxygen gas via electrolysis.

17. The method of claim 16 wherein the exothermic reaction comprises the following reactions:

$$Al_2(SO_4)_3 + 6H_2O + 2Al \rightarrow 2Al(OH)_3 + Al_2(SO_4)_3 + 3H_2;$$
and $$Al_2(SO_4)_3 + 6H_2O \rightarrow 2Al(OH)_3 + 3H_2SO_4.$$

18. The method of claim 16 comprising stopping application of the voltage across the reactor without stopping the production of hydrogen gas or oxygen gas.

19. The method of claim 16 wherein the electrolyte solution is about 0.1M-0.2M aluminum sulfate, about 0.03M-0.04M ammonium salt catalyst.

20. The method of claim 16 wherein the step of applying a voltage across the reactor comprises applying a voltage of greater than 0 and less than or equal to 0.3V.

21. A method of conducting electrolysis at low voltages comprising:
    providing an electrolysis reactor having a copper or copper alloy cathode and an aluminum or aluminum alloy anode;
    filling the electrolysis reactor with a sufficient amount of solution such that at least a portion of the anode and the cathode are immersed in the solution; the solution comprising water and an aluminum sulfate and an ammonium salt catalyst;
    running exothermic reactions between water and the anode and between the aluminum sulfate and water to produce a precipitate; and
    applying a voltage across the reactor of greater than 0V and less than or equal to 1.23V; and
    producing hydrogen gas and oxygen gas via electrolysis.

* * * * *